United States Patent
Varonis et al.

(10) Patent No.: US 7,478,567 B2
(45) Date of Patent: Jan. 20, 2009

(54) EDDY CURRENT SENSOR ASSEMBLY FOR SHAFT TORQUE MEASUREMENT

(75) Inventors: Orestes J. Varonis, North Canton, OH (US); Duane L. Carnahan, Massillon, OH (US)

(73) Assignee: The Timken Company, Canton, OH (US)

( * ) Notice: Subject to any disclaimer, the term of this patent is extended or adjusted under 35 U.S.C. 154(b) by 16 days.

(21) Appl. No.: 10/514,872

(22) PCT Filed: May 15, 2003

(86) PCT No.: PCT/US03/15494

§ 371 (c)(1), (2), (4) Date: Sep. 12, 2005

(87) PCT Pub. No.: WO03/098178

PCT Pub. Date: Nov. 27, 2003

(65) Prior Publication Data

US 2006/0137475 A1    Jun. 29, 2006

Related U.S. Application Data

(60) Provisional application No. 60/383,945, filed on May 29, 2002, provisional application No. 60/380,725, filed on May 15, 2002.

(51) Int. Cl.
*G01L 3/00*    (2006.01)
(52) U.S. Cl. .................................. 73/862.333
(58) Field of Classification Search ..................
73/862.331–862.338
See application file for complete search history.

(56) References Cited

U.S. PATENT DOCUMENTS

| 2,365,073 | A |   | 12/1944 | Haight |
| 2,438,288 | A | * | 3/1948 | Jacobson et al. ............ 318/606 |
| 2,912,642 | A |   | 11/1959 | Dahle |
| 3,664,473 | A | * | 5/1972 | Hendershot et al. ........ 192/21.5 |
| 4,306,462 | A |   | 12/1981 | Meixner |
| 4,364,278 | A |   | 12/1982 | Horter et al. |
| 4,479,390 | A |   | 10/1984 | Meixner |
| 4,506,554 | A |   | 3/1985 | Blomkvist et al. |
| 4,589,290 | A |   | 5/1986 | Sugiyama et al. |

(Continued)

FOREIGN PATENT DOCUMENTS

| DE | 3437379 | 4/1985 |
| DE | 10117724 | 10/2002 |

*Primary Examiner*—Harshad Patel
*Assistant Examiner*—Octavia Davis
(74) *Attorney, Agent, or Firm*—Polster, Lieder, Woodruff & Lucchesi, L.C.

(57) ABSTRACT

The present disclosure provides a device for sensing a torque applied through a shaft 18. The device comprises a magnetoelastic ring 24 press-fitted onto the shaft 18 and an excitation coil 2 placed in close proximity to the ring 24 at only a point along the circumference of the ring 24. The coil 2 is driven by an oscillator 4 for inducing eddy currents inside the material of the ring 24. A sensing coil 8 is also placed in close proximity to the magnetoelastic ring 24 at only a point along the circumference of the ring 24 for sensing the magnetic field generated by the induced eddy currents inside the ring 24. An electrical circuit senses any change in the magnetoelastic ring's 24 electrical conductivity and magnetic permeability.

16 Claims, 8 Drawing Sheets

U.S. PATENT DOCUMENTS

| | | | |
|---|---|---|---|
| 4,873,874 A | 10/1989 | Sobel | |
| 4,876,899 A | 10/1989 | Strott et al. | |
| 4,881,414 A | 11/1989 | Setaka et al. | |
| 4,882,936 A * | 11/1989 | Garshelis | 73/862.333 |
| 4,920,809 A | 5/1990 | Yoshimura et al. | |
| 5,018,393 A | 5/1991 | Seegers | |
| 5,052,232 A * | 10/1991 | Garshelis | 73/862.336 |
| 5,107,711 A | 4/1992 | Aoki et al. | |
| 5,146,790 A * | 9/1992 | Fish | 73/862.336 |
| 5,255,567 A | 10/1993 | Miyake et al. | |
| 5,307,690 A | 5/1994 | Hanazawa | |
| 5,323,659 A | 6/1994 | Wakamiya et al. | |
| 5,351,555 A | 10/1994 | Garshelis | |
| 5,386,733 A * | 2/1995 | Hesthamar et al. | 73/862.333 |
| 5,465,627 A | 11/1995 | Garshelis | |
| 5,520,059 A | 5/1996 | Garshelis | |
| 5,526,704 A | 6/1996 | Hoshina et al. | |
| 5,562,004 A * | 10/1996 | Kaise et al. | 73/862.336 |
| 5,664,638 A | 9/1997 | Padula | |
| 5,708,216 A | 1/1998 | Garshelis | |
| 6,098,468 A | 8/2000 | Mohri et al. | |
| 6,237,428 B1 | 5/2001 | Odachi et al. | |
| 6,260,422 B1 | 7/2001 | Odachi et al. | |
| 6,289,748 B1 | 9/2001 | Lin et al. | |
| 6,341,534 B1 * | 1/2002 | Dombrowski | 73/862.333 |
| 6,370,967 B1 | 4/2002 | Kouketsu et al. | |
| 6,490,934 B2 * | 12/2002 | Garshelis | 73/862.336 |
| 6,553,847 B2 * | 4/2003 | Garshelis | 73/862.336 |
| 6,581,480 B1 * | 6/2003 | May et al. | 73/862.333 |
| 6,871,553 B2 * | 3/2005 | Naidu et al. | 73/862.331 |
| 6,997,065 B2 * | 2/2006 | May | 73/862.331 |
| 7,062,981 B1 * | 6/2006 | Spohr | 73/862.333 |
| 7,143,656 B2 * | 12/2006 | Wan et al. | 73/862.331 |
| 2001/0029791 A1 | 10/2001 | Sezaki | |

\* cited by examiner

EDDY CURRENT SENSOR ASSEMBLY FOR SHAFT TORQUE MEASUREMENT

CROSS-REFERENCE TO RELATED APPLICATIONS

The present application claims priority to U.S. Patent Provisional Patent Application Ser. No. 60/380,725 filed May 15, 2002 entitled Eddy Current Sensor Assembly for Shaft Torque Measurement, the contents of which are incorporated herein by reference, and U.S. Patent Provisional Patent Application Ser. No. 60/383,945 filed May 29, 2002 entitled In-Bearing Torque Sensor Assembly, the contents of which are incorporated herein by reference.

TECHNICAL FIELD

In the past it has been known that the magnetic permeability of ferromagnetic materials changes when stress is applied to the material. Such a property of a material is referred to as magnetostriction. In addition, induced stress on a conductive material alters its electrical conductivity. Taking advantage of these two properties, many devices have been built to sense changes in the electrical conductivity and magnetic permeability of a ferromagnetic shaft in order to determine the torque that the shaft is under. However, many of these prior inventions either require a device that completely surrounds the shaft rather than a device that is placed adjacent to the shaft at a single point, or that a device is placed directly over the ferromagnetic shaft at a single point. The difficulty of the prior art sensors that completely surround the shaft is that they are bulky and difficult to install and remove. The difficulty of the prior art sensors that are placed directly over the shaft at a single point is that they work only on ferromagnetic shafts and that they lack sensitivity and reproducibility as applied to different shafts. The present invention overcomes these problems by first providing a press-fitted magnetoelastic ring over the shaft whose torque is measured and then providing a sensor over the magnetoelastic ring at a single point along its circumference that detects changes of the ring's electrical conductivity and magnetic permeability due to the stresses induced by the shaft.

BACKGROUND ART

In one aspect the present invention provides a device for sensing a torque applied through a shaft. The device comprises a magnetoelastic ring press-fitted on the shaft whose torque is measured and an excitation coil placed in close proximity to the magnetoelastic ring at only a point along the circumference of the ring. The coil is driven by an oscillator for inducing eddy currents inside the material of the ring. A sensing coil is also placed in close proximity to the ring at only a point along the circumference of the ring for sensing the magnetic field generated by the induced eddy currents inside the ring. An electrical circuit senses any change in the ring's electrical conductivity and magnetic permeability.

BEST MODE FOR CARRYING OUT THE INVENTION

Figure 1:
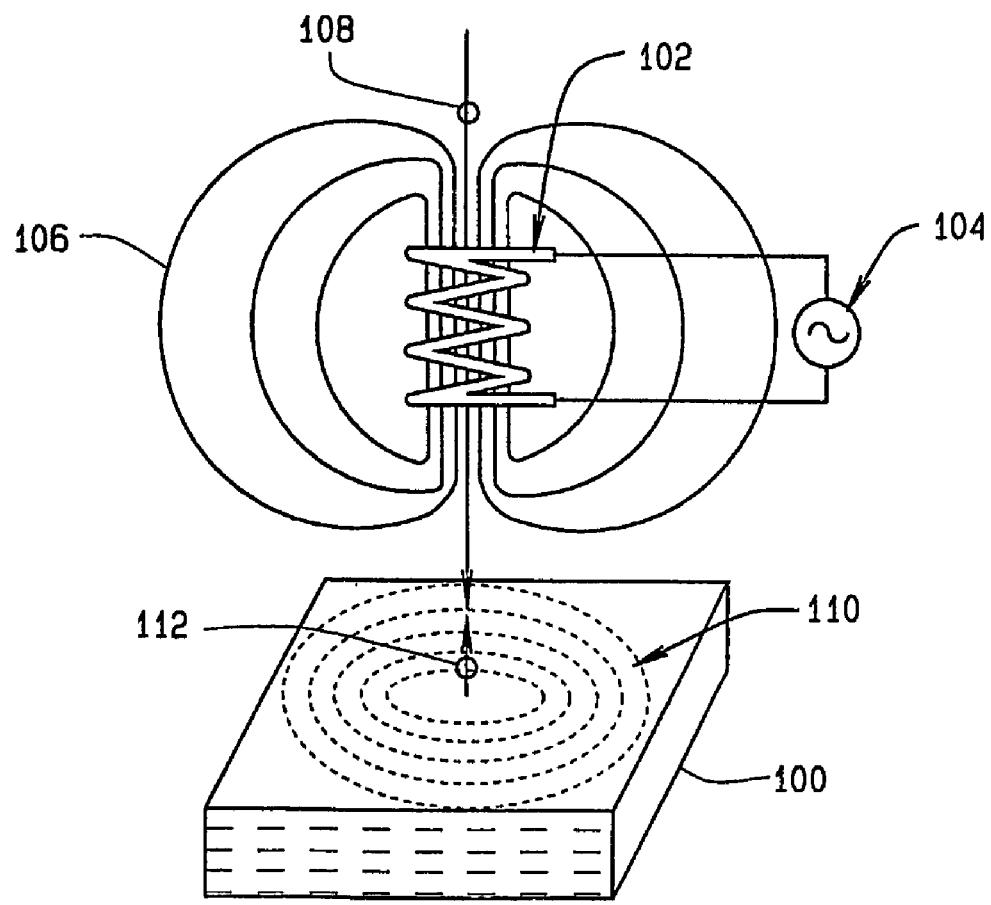
FIG. 1 is a schematic showing the generation of eddy currents inside a conductive material.

While the invention is susceptible of embodiment in many different forms, there is shown in the drawings and described in detail preferred embodiments of the invention. It is to be understood that the present disclosure is to be considered only as an example of the principles of the invention. This disclosure is not intended to limit the broad aspect of the invention to the illustrated embodiments. The scope of protection should only be limited by the accompanying claims.

Figure 3:
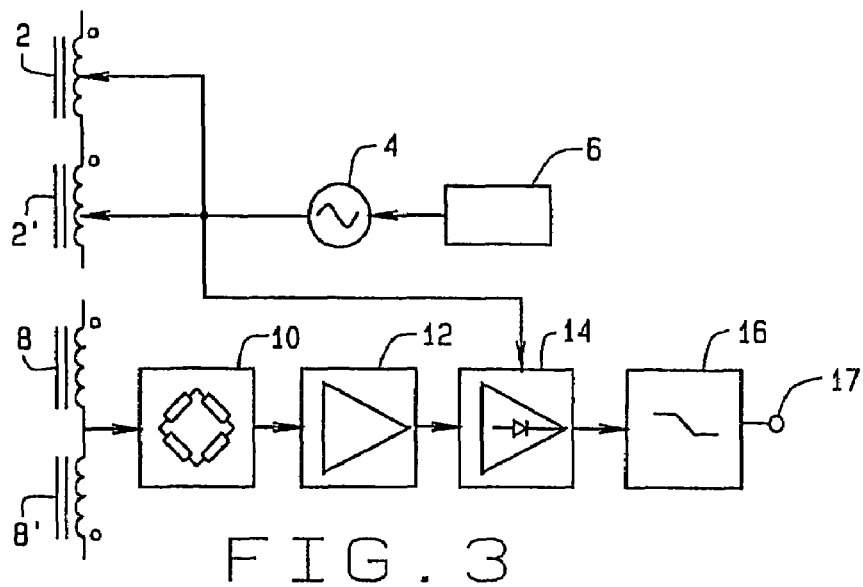
FIG. 3 is an electrical schematic of a differential eddy current sensor according to another embodiment of the present invention.

Referring to FIG. 1, the electrical conductivity (σ) of a given material provides a measure of how easily electrical currents flow through the material. Its magnetic permeability (µ) provides a measure of how easily magnetic flux lines permeate through the material. These two parameters determine the way a given material interacts with electric and magnetic fields. When a piece of material 100 is exposed to an excitation coil 102 powered by an oscillator 104 magnetic flux (represented by magnetic flux lines 106) is created a round the coil 102 and a magnetic field 108 is applied to the material 100. The magnetic field 108 induces eddy currents 110 in the material which create an opposing magnetic field 112. Eddy currents (EC) are circulating currents in conductive materials that are produced as a result of time-varying magnetic flux passing through the material. Therefore, ECs are induced inside a conductive material that is near an electrical coil powered by an AC current. The EC generation is due to the interaction of the material's conductive electrons and the AC magnetic field that is generated around the coil by the current through it and depends on the material's electrical conductivity and magnetic permeability. Referring to FIG. 3, when a ferromagnetic material, such as a steel shaft, is under torque, the material's electrical conductivity and magnetic permeability are changed in relation to the amount of torque across the material. By sensing the change in electrical conductivity and magnetic permeability, one can determine the amount of torque being applied through the shaft.

Figure 2:
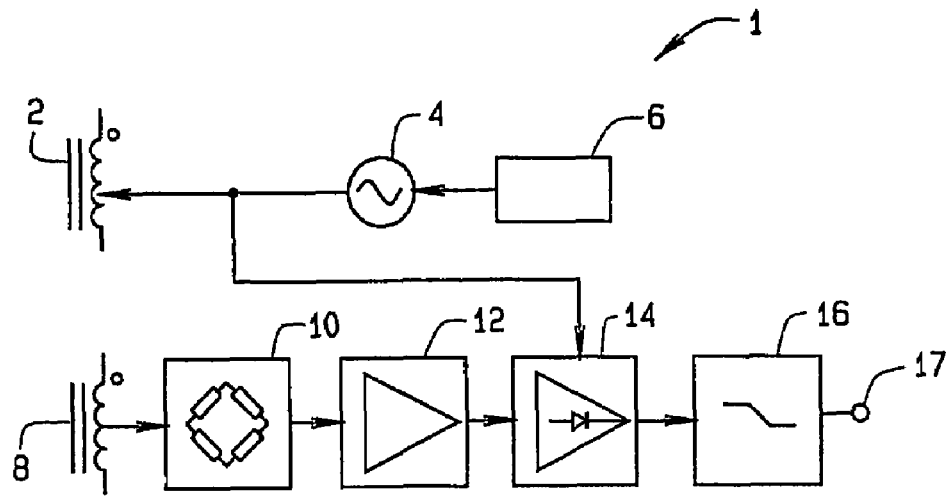
FIG. 2 is an electrical schematic of an absolute eddy current sensor according to one embodiment of the present invention.

Referring to FIG. 2, an absolute EC sensor 1 consists of an excitation coil 2 driven by an oscillator 4 powered by a power source 6 that, when energized, induces eddy currents inside any conductive material at close proximity to it. A sensing coil 8 senses the magnetic field generated by the induced electrical currents inside the conductive material. The current generated in the sensing coil 8 by the sensed magnetic field is supplied to a bridge balancing circuit 10, an amplifier 12, a demodulator 14 and a filter 16 to create a sensor output 17. The generated magnetic field is determined by the path and strength of the eddy current flow, which in turn depends on the material geometry and its $\sigma$ and $\mu$ local values. Thus, absolute EC sensors 1 with a single excitation/sensing element pair have been successfully used for characterization of conductive materials.

Referring to FIG. 3, a differential EC sensor has two excitation/sensing element pairs and is used primarily for the detection of small-localized metallurgical or geometrical anomalies of conductive components. FIG. 3 shows such a sensor that is similar to that of FIG. 2 but adding a second excitation element 2' and a second sensing element 8'. The excitation elements 2 and 2' of a differential EC sensor generate magnetic fields that have approximately the same amplitude and phase. However, its sensing elements 8 and 8' generate signals of approximately equal amplitude but have opposite phase.

Figure 4:
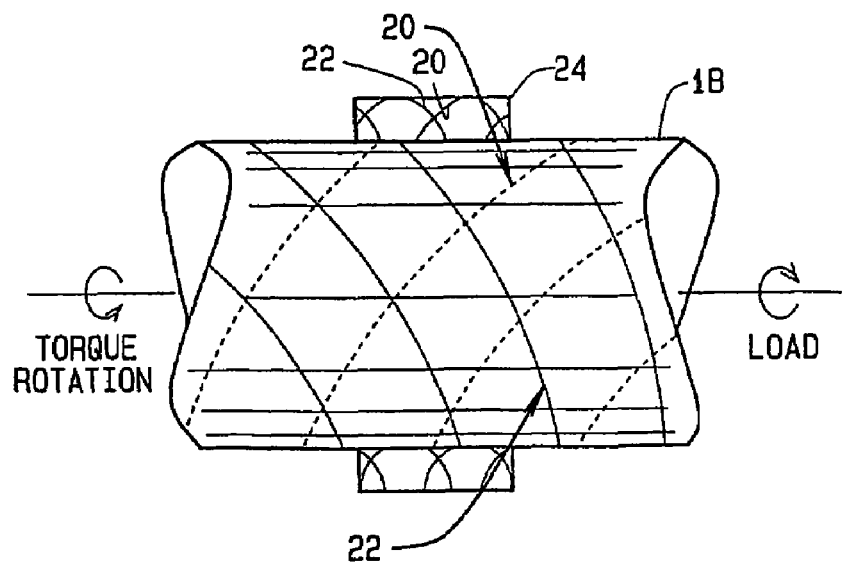
FIG. 4 is a side view of a shaft under torque indicating lines of compression and tension within the shaft.

Referring to FIG. 4, torque transmitted through a shaft 18 generates a shear stress throughout the shaft 18 that varies from zero at its center to a maximum value at its surface. Lines of tension 20 and lines of compression 22 are formed along the shaft 18 as a result of the applied torque. These torque-induced tension and compression lines 20, 22 are normal to each other and are formed at ±45° from the axis of symmetry. A magnetoelastic ring 24 that is press-fitted onto the shaft 18 would also experience the generated shear stress, and lines of tension 20 and lines of compression 22 are formed in the ring 24 as well.

The electrical conductivity ($\sigma$) and the magnetic permeability ($\mu$) values of the magnetoelastic ring 24 are altered by the generated shear stress with the values being different along the lines of tension from those along the lines of compression (i.e. $\sigma_{tension} \neq \sigma_{compression}$ and $\mu_{tension} \neq \mu_{compression}$). Thus, a differential EC sensor placed over the magnetoelastic ring 24 so that one of its excitation/sensing element pairs focuses along the lines of tension and the other excitation/sensing element pair focuses along the lines of compression (FIG. 5), would sense the local value difference of $\sigma$ and $\mu$ along the magnetoelastic ring and would provide a measure of the applied shaft torque.

Alternatively, depending on the application constraints, two magnetoelastic rings 24 may be press-fitted onto the shaft 18. In this situation, two differentially hooked-up EC sensors, one focusing along the lines of tension of the first ring and the other along the lines of compression of the second ring, would provide similar test results (FIG. 6).

Figure 7:
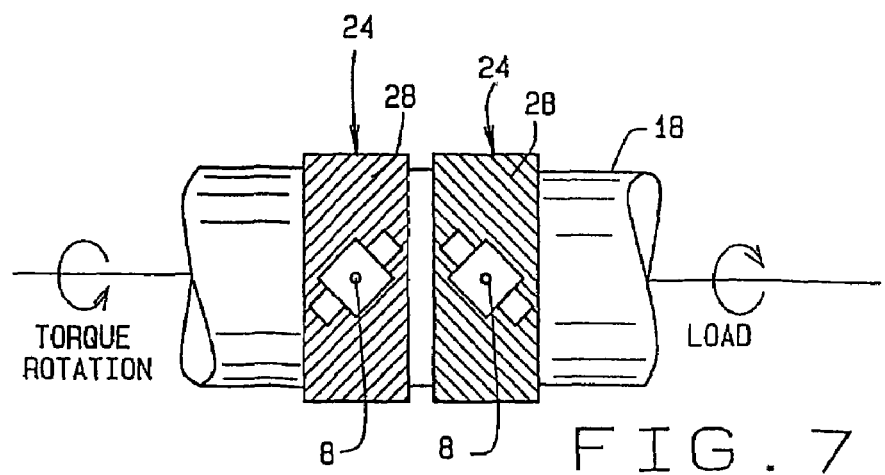
FIG. 7 is a side view of a shaft with eddy current sensors according to another embodiment of the present invention.

Referring to FIG. 7, in certain applications where high torque-sensitivity is required, knurled grooves 28 can be placed on the press-fitted magnetoelastic rings over the outside diameter surface in order to increase the EC sensor response. Under this configuration, the sensor excitation/sensing element pair that focuses on the lines of tension has knurl grooves that are placed parallel to the direction of lines of tension. In the same way, the magnetoelastic ring where the sensor excitation/sensing element pair focuses on the lines of compression has knurl grooves that are placed parallel to the direction of lines of compression.

Figure 8:
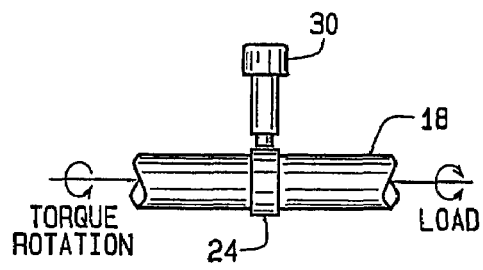
FIG. 8 is a side view of a shaft with an eddy current sensor according to another embodiment of the present invention.
Figure 9:
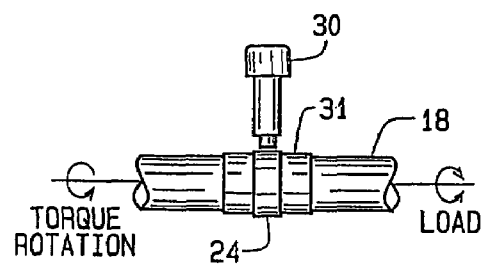
FIG. 9 is a side view of a shaft with an eddy current sensor according to another embodiment of the present invention.

The EC sensors of the present invention may be implemented in one of several ways. Referring to FIG. 8, the simplest embodiment involves attaching a single excitation/sensing element-pair EC sensor 30 along with its associated electronics to a fixed position adjacent the ring 24 that has been pressed onto the rotating shaft 18. In this configuration, loads or moments acting upon the torque-carrying shaft could affect the EC sensor output and thus, this type of assembly is recommended for shaft applications that carry only pure torque. Here, the shaft could have any type of shape, size, and alloy composition and have been made by any given manufacturing process. Referring to FIG. 9, in certain applications, hysteresis effects can be minimized with the use of a hardened metal coupling sleeve 31 press-fitted between the shaft OD surface and the magnetoelastic ring ID surface. While not described explicitly, any of the embodiments later described in the present application may also use a coupling sleeve 31 in order to minimize hysteresis effects. Additionally, below, each separate configuration is described with respect to single excitation/sensing element-pair sensors. However, one of ordinary skill in the art would recognize the single excitation/sensing element-pair sensors or sensors where the electronics and sensing coils are separate could be used interchangeably.

Figure 6:
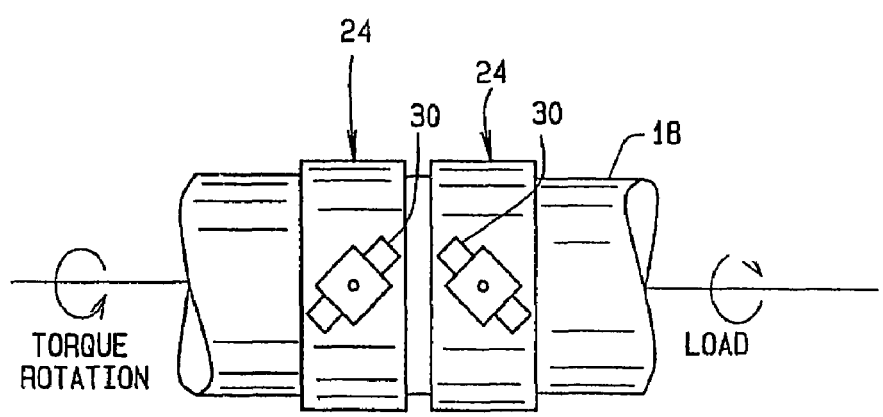
FIG. 6 is a side view of a shaft with eddy current sensors according to another embodiment of the present invention.
Figure 5:
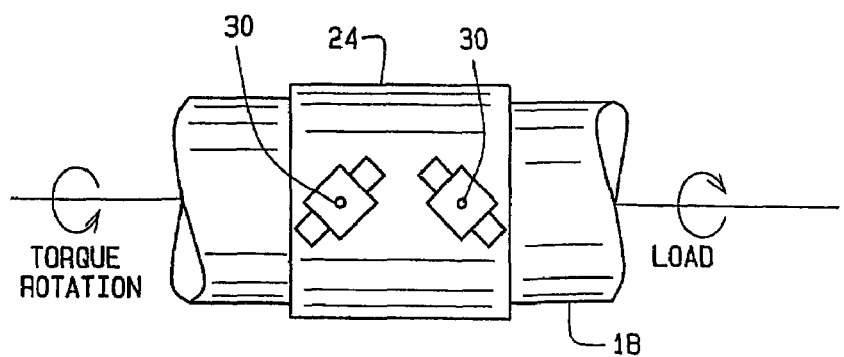
FIG. 5 is a side view of a shaft with eddy current sensors according to one embodiment of the present invention.

Referring to FIG. 6, a single element-pair sensor 30 is attached in a fixed position over each of two magnetoelastic rings 24, respectively, that are pressed onto shaft 18 such that one sensor 30 is focused upon the lines of compression and the other sensor 30 is focused upon the lines of tension. The two sensors are then differentially connected together in order to cancel out load and moment effects on the sensor assembly output. Referring to FIG. 5, the configuration of FIG. 6 is modified such that the two rings 24 are replaced with a single ring 24 of greater width.

Figure 10:
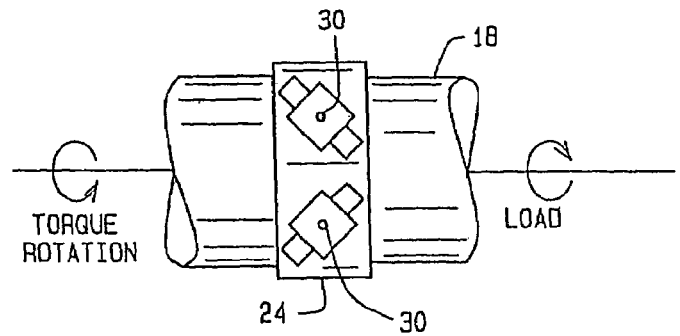
FIG. 10 is a side view of a shaft with eddy current sensors according to another embodiment of the present invention.
Figure 11:
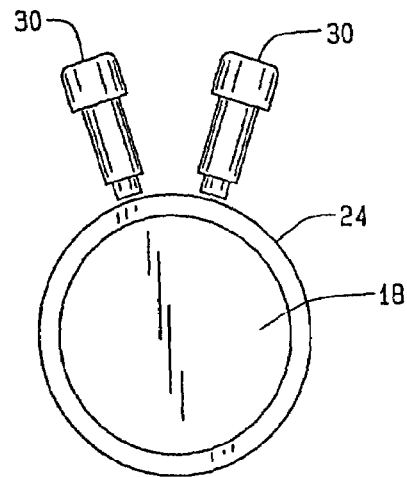
FIG. 11 is an end view of a shaft with eddy current sensors according to the embodiment of FIG. 10.

Referring to FIGS. 10 and 11, single element-pair sensors 30 are placed in a fixed position about a rotating shaft 18. The sensors 30 are placed about the same circumferential line and angularly displaced about that line. One sensor 30 is focused upon the lines of compression and one sensor 30 is focused upon the lines of tension. The sensors 30 are attached in a differential sensor pair in order to cancel out load and moment effects on the sensor assembly output. Summation of the sensor pair signals constitutes the sensor assembly output.

Figure 12:
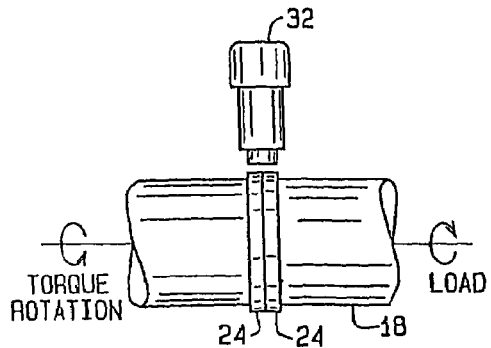
FIG. 12 is a side view of a shaft with a differential eddy current sensor according to another embodiment of the present invention.

Referring to FIG. 12, dual element-pair differential sensors 32 are used. A dual element-pair differential sensor 32 is a complete sensor that incorporates two sensing elements 8, 8', as described above, and their corresponding electronics. The dual element-pair sensor 32 is placed over two magnetoelastic rings 24 press-fitted onto a torque-carrying shaft 18 so that each sensing element 8 and 8' is axially aligned along the shaft 18 with the other and adjacent one of the rings 24. Alternately, the dual element-pair sensor 32 could be axially placed over a single magnetoelastic ring 24 press-fitted onto a torque-carrying shaft 18, as in FIG. 13. Here, for each dual element-pair sensor 32, one sensing element 8 is focused along the lines of tension and the other sensing element 8' along the lines of compression. In this configuration, the effect of loads or moments acting upon the torque-carrying shaft 18 have on the sensor output are cancelled out by the differential nature of each sensor.

Figure 13:
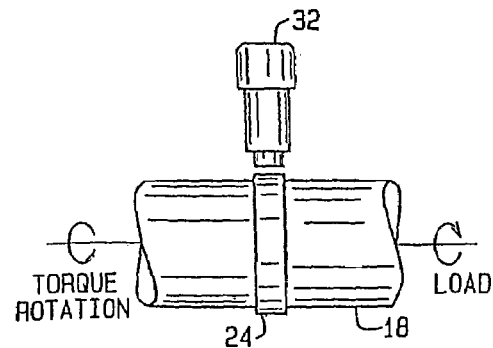
FIG. 13 is a side view of a shaft with a differential eddy current sensor according to another embodiment of the present invention.
Figure 14:
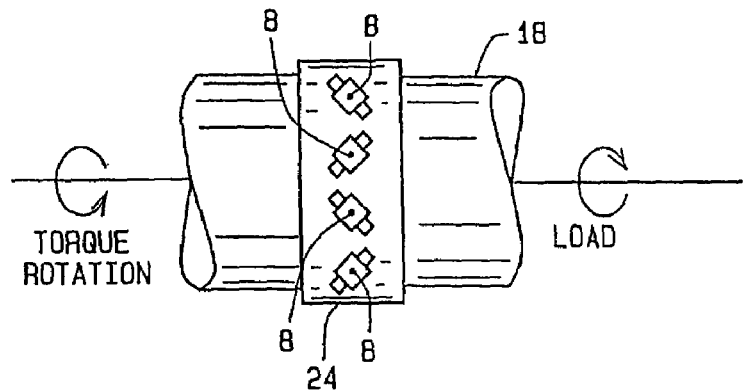
FIG. 14 is a side view of a shaft with eddy current sensors according to another embodiment of the present invention.
Figure 15:
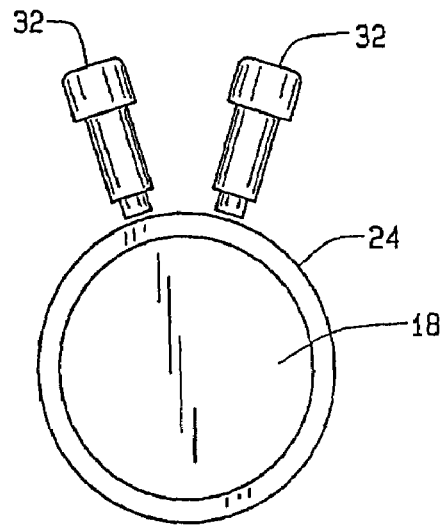
FIG. 15 is an end view of a shaft with eddy current sensors according the embodiment of FIG. 14.

Referring to FIGS. 14 and 15, as in FIGS. 12 and 13, two dual element-pair differential sensors 32 are placed over and near a magnetoelastic ring 24 press-fitted onto a torque-carrying shaft 18 so that the sensors 32 and their corresponding sensing elements 8, 8' are circumferentially located and angularly displaced about the shaft. Here, for each dual element-pair sensor 32, one sensing element 8 is focused along the lines of tension and the other sensing element 8' along the lines of compression. In this configuration, the effect that loads or moments acting upon the torque-carrying shaft have on the sensor output are cancelled out by the differential nature of each sensor. Summation of each sensor signal constitutes the sensor assembly output.

Figure 16:
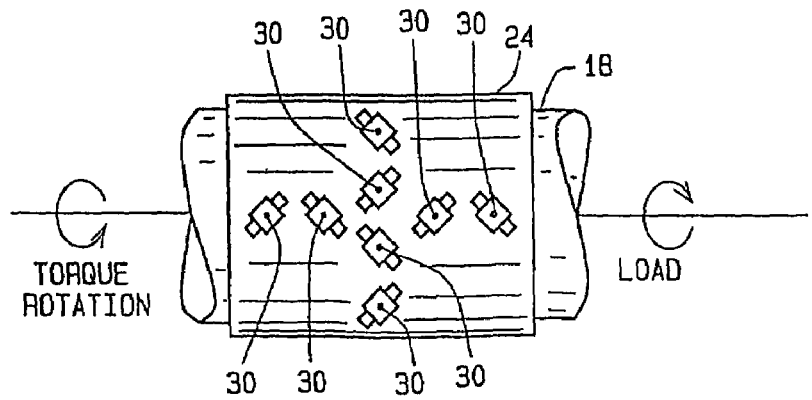
FIG. 16 is a side view of a shaft with eddy current sensors according to another embodiment of the present invention.

Referring to FIG. 16, multiple single element-pair EC sensors 30 and their corresponding electronics are placed over and near a magnetoelastic ring 24 press-fitted onto a torque-carrying shaft 18 so that some of the sensors 30 are axially located along the shaft 18 and some circumferentially located around the shaft. In both the axial and circumferential sensor sets, adjacent sensors 30 are focused alternatingly along lines of tension and lines of compression. Differential sensor pairs are formed among both the axially and circumferentially placed sensors 30 by selecting one sensor focusing on lines of tension and another on lines of compression in order to cancel out load and moment effects on the sensor assembly output. Summation of all sensor signals constitutes the sensor assembly output. It can be understood by one of ordinary skill in the art that a pair of single element-pair sensors 30 may be replaced a single dual element-pair sensor 32.

Referring to FIGS. 5-16, each configuration contemplates the sensor being held to a fixed point near the rotating shaft. While in many situations this is acceptable, this configuration allows the distance between the shaft and the sensor to vary due to an out-of-round condition of the shaft or misalignment or wear of the bearing that support the shaft. As a result, the sensor excitation field strength at the magnetoelastic ring surface will tend to fluctuate with the varying distance, which would cause the sensor output to fluctuate also. In order to hold the sensor at a fixed distance with respect to the magnetoelastic ring, in FIGS. 17-19, there is show an arrangement where the sensor 30 is held to a sensor support block 38. The sensor support block 38 is attached to an assembly ring 39 and each is kept from rotating by a flange 44 (FIG. 19) held to a reference point (not shown) and mounted to the rotating shaft by two bearings 40, 42. As such the distance between the sensor 30 and the rotating magnetoelastic ring 24 is kept substantially constant. As can be understood by one of ordinary skill in the art any of the above sensor configurations of FIGS. 5-16 (incorporating single and dual element sensors) can be implemented by mounting them in the arrangement of FIGS. 17-19.

Figure 17:
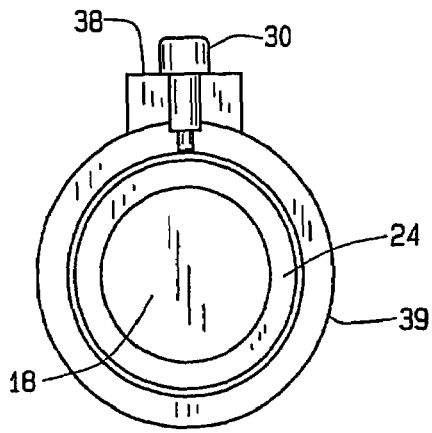
FIG. 17 is an end view of a shaft with an eddy current sensor according to the embodiment of the FIG. 18.
Figure 18:
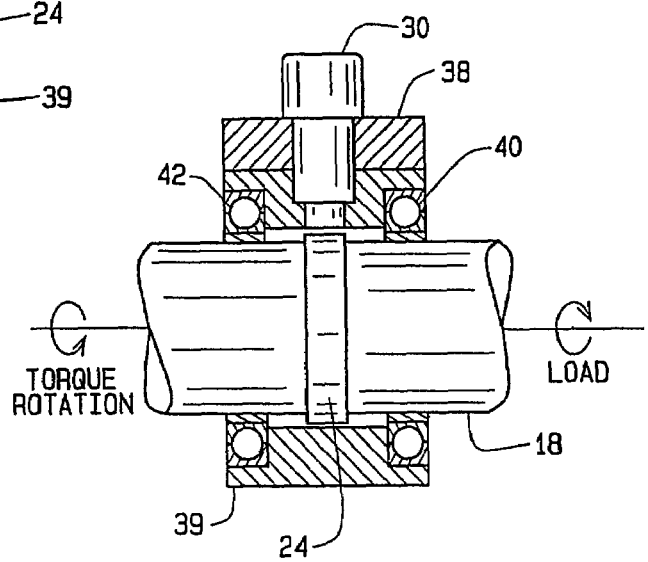
FIG. 18 is a side sectional view of a shaft with an eddy current sensor according to another embodiment of the present invention.
Figure 19:
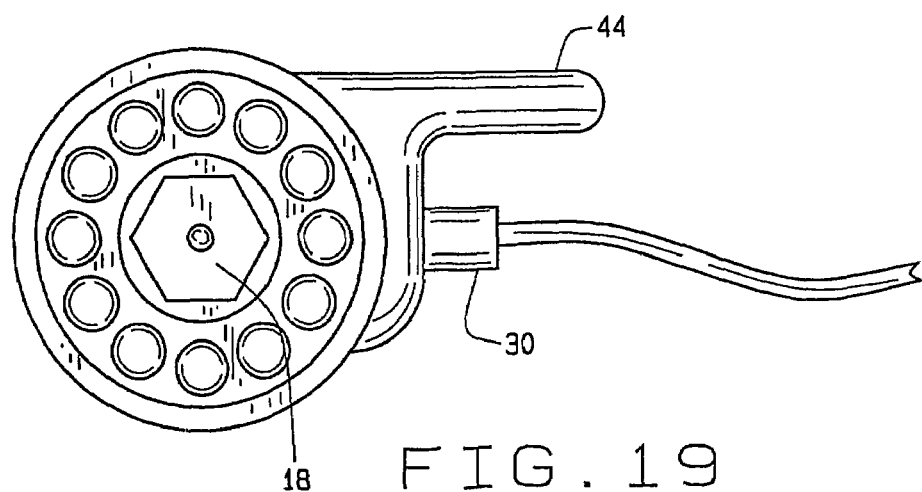
FIG. 19 is a side view of a shaft with an eddy current sensor according to another embodiment of the present invention.
Figure 20:
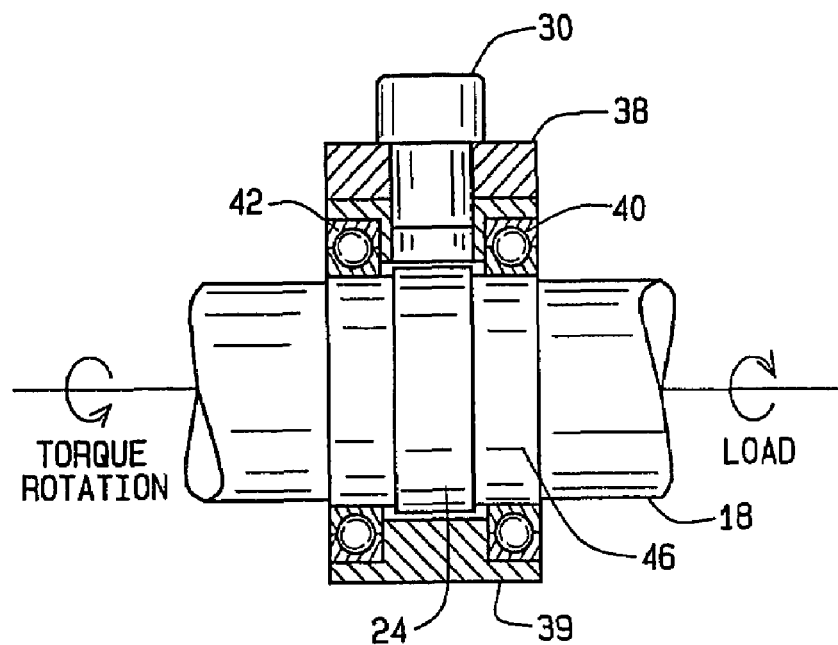
FIG. 20 is a side view of a shaft with an eddy current sensor according to another embodiment of the present invention.
Figure 21:
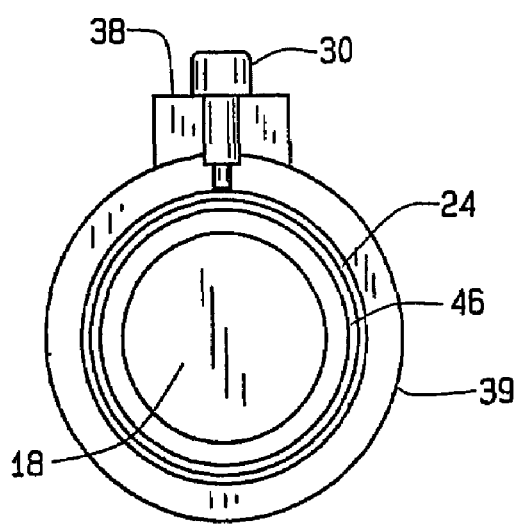
FIG. 21 is an end view of a shaft with an eddy current sensor according to the embodiment of the FIG. 20.

Referring to FIGS. 20 and 21, the arrangement of FIGS. 17-19 is modified such that the sensor 30 mounted upon the bearings 40, 42 may be installed as a single unit. This is accomplished by providing a sleeve 46 onto which magnetoelastic sleeve 24 and bearings 40, 42 have been pressed. The unit is then pressed onto the shaft 18.

While the specific embodiments have been illustrated and described, numerous modifications come to mind without significantly departing from the spirit of the invention, and the scope of protection is only limited by the scope of the accompanying claims.

The invention claimed is:

1. A device for sensing a torque applied through a shaft having a longitudinal axis of rotation, the device comprising:
   a magnetoelastic ring press-fitted on the shaft whose torque is measured;
   an excitation coil placed in close proximity to the magnetoelastic ring with a longitudinal excitation axis of said excitation coil radially aligned with said axis of rotation at a selected radial position on an outer circumferential surface of the magnetoelastic ring, the excitation coil driven by an oscillator for inducing localized eddy currents inside the material of the magnetoelastic ring;
   a coupling sleeve disposed between the shaft and the magnetoelastic ring to minimize hysteresis effects of the shaft upon the magnetoelastic ring during induction of said localized eddy currents;
   a sensing coil placed in close proximity to the magnetoelastic ring with a longitudinal sensing axis of said sensing coil radially aligned with said axis of rotation at a radial position on the outer circumferential surface of the magnetoelastic ring and in close proximity to the excitation coil for sensing the magnetic field generated by the induced eddy currents inside the magnetoelastic ring;
   an electrical circuit configured to receive signals from said sensing coil to detect changes in the magnetoelastic ring's electrical conductivity and magnetic permeability responsive to applied torque forces in the shaft.

2. The device of claim 1 wherein the electrical circuit comprises:
   a bridge balancing circuit that receives an output of the sensing coil;
   an amplifier for amplifying the output of the bridge balancing circuit
   a demodulator for demodulating the output of the amplifier; and
   a filter that filters the output of the demodulator to generate a sensor output.

3. The device of claim 1 further comprising:
   a second excitation coil with a longitudinal excitation axis of said second excitation coil radially aligned with said axis of rotation disposed at a second radial position on the outer circumferential surface of the ring, said second excitation coil driven by an oscillator for inducing a second localized eddy current inside the material of the ring; and
   a second sensing coil with a longitudinal sensing axis of said sensing coil radially aligned with said axis of rotation disposed at a radial position on the outer circumferential surface of the ring and in close proximity to the second excitation coil, wherein the first and second sensing coils generate signals of approximately equal amplitude and opposite phase.

4. The device of claim 3 further comprising:
   the first of the excitation and sensing coils disposed to focus on a line of compression or tension of the magnetoelastic ring;
   the second of the excitation and sensing coils disposed to focus on an opposite of the line of compression or tension focused upon by the first of the excitation and sensing coils.

5. The device of claim 4 wherein the magnetoelastic ring is divided into a first and a second magnetoelastic ring, the first magnetoelastic ring having the first excitation and sensing coils focused upon it and the second magnetoelastic ring having the second excitation and sensing coils focused upon it.

6. The device of claim 4 wherein the first and second excitation coils are placed side-by-side along the center axis of the shaft.

7. The device of claim 4 wherein the first and second excitation coils are placed side by side along the circumference of the shaft.

8. The device of claim 4 wherein the first and second excitation and sensing coils are incorporated into a single physical package.

9. The device of claim 4 wherein the first and second excitation and sensing coils are incorporated into separate physical packages.

10. The device of claim 4 wherein the magnetoelastic ring has knurled grooves over its outside diameter.

11. The device of claim 10 wherein the knurled grooves circumferentially adjacent the first excitation and sensing coils are disposed at +45 degrees from the axis defined by the center axis of the shaft and the knurled grooves circumferentially adjacent the second excitation and sensing coils are disposed at −45 degrees from the axis defined by the center axis of the shaft, such that the knurled grooves are parallel to the lines of tension and compression of the magnetoelastic ring.

12. The device of claim 4 further comprising third and fourth excitation coils and third and fourth sensing coils, the third sensing and excitation coils focused on one of a line of compression or tension of the magnetoelastic ring and the fourth sensing and excitation coils focusing on the other of the line of tension or compression of the magnetoelastic ring.

13. The device of claim 4 further comprising third and fourth excitation coils and third and fourth sensing coils, the third sensing and excitation coils focused on one of a line of compression or tension of the magnetoelastic ring and the fourth sensing and excitation coils focusing on the other of the line of tension or compression of the magnetoelastic ring, the third and fourth sensing and excitation coils aligned along the circumference of the magnetoelastic ring;

fifth, sixth, seventh and eighth excitation and sensing coils disposed parallel to the center axis of the shaft.

14. The device of claim 1 wherein said coupling sleeve is composed of a hardened metal.

15. The device of claim 1 wherein the sensing and excitation coils are mounted upon a sensor support block, the sensor support block attached to an assembly ring that is disposed about the shaft and attached to the shaft by a bearing, the support block is kept from rotating with the shaft by a flange that is held to a fixed position with reference to the axis of rotation of the shaft.

16. The device of claim 1 wherein the sensing and excitation coils are mounted upon a sensor support block, the sensor support block attached to an assembly ring that is disposed about the shaft and attached to a sleeve by a bearing, the sleeve further being pressed onto the shaft and wherein the sensor support block is kept from rotating with the shaft by a flange that is held to a fixed position with reference to the axis of rotation of the shaft.

* * * * *